United States Patent [19]
Sumi et al.

[11] Patent Number: 5,083,898
[45] Date of Patent: Jan. 28, 1992

[54] BASE PLATE CONVEYOR

[75] Inventors: Shigeo Sumi, Hasuda; Fumio Hamamura, Yokohama; Noriyasu Sawada, Hasuda, all of Japan

[73] Assignee: Somar Corporation, Tokyo, Japan

[21] Appl. No.: 437,567

[22] Filed: Nov. 17, 1989

[30] Foreign Application Priority Data

Nov. 18, 1988 [JP] Japan .................. 63-291815

[51] Int. Cl.$^5$ .................. B65H 29/44; B65H 31/06
[52] U.S. Cl. .................. 414/798.5; 414/798.9; 414/799; 271/184; 271/107
[58] Field of Search .................. 414/798.5, 798.9, 799, 414/797, 793, 737, 752; 901/40; 271/107, 184

[56] References Cited

U.S. PATENT DOCUMENTS

| | | | |
|---|---|---|---|
| 3,836,017 | 9/1974 | Bargstedt | 414/793 |
| 3,934,871 | 1/1976 | Dean | 414/799 X |
| 4,093,083 | 6/1978 | Klaus | 414/798.5 |
| 4,228,886 | 10/1980 | Moran | 414/793 X |
| 4,444,537 | 4/1984 | Werner | 414/798.5 |

FOREIGN PATENT DOCUMENTS

| | | | |
|---|---|---|---|
| A799535 | 8/1973 | Belgium . | |
| B1280750 | 10/1968 | Fed. Rep. of Germany . | |
| 2242934 | 3/1974 | Fed. Rep. of Germany | 414/798.9 |
| A2647589 | 4/1978 | Fed. Rep. of Germany . | |
| 217180 | 4/1987 | Fed. Rep. of Germany | 414/798.9 |
| U8707402 | 7/1987 | Fed. Rep. of Germany . | |
| A3735851 | 5/1989 | Fed. Rep. of Germany . | |
| 485077 | 9/1975 | U.S.S.R. | 414/798.5 |
| A1287512 | 8/1972 | United Kingdom . | |
| A2010784 | 7/1979 | United Kingdom . | |

*Primary Examiner*—Frank E. Werner
*Assistant Examiner*—B. Dinicola
*Attorney, Agent, or Firm*—Sughrue, Mion, Zinn, Macpeak & Seas

[57] ABSTRACT

A base plate conveyor for supplying a base plate storage section at one end of a base plate conveyance passage to the conveyance surface of the passage or receiving the base plate from the passage to the storage section. The conveyor is characterized by including the base plate storage section in which a plurality of base plates can be piled so that the base plates are leant against the inside of the section and the conveyed surface of the base plates have a predetermined angle to the conveyance surface of the conveyance passage; and a base plate mover provided at the casing of the conveyor so as to automatically move the base plate from the storage section to the conveyance passage or from the conveyance passage to the storage section. The base plate mover includes a vertically swung arm member, which is swung vertically and translated so as to move the base plate between the base plate storage section and the base plate conveyance passage. The arm member is provided with a suction so as to suck the conveyed surface of the base plate by vacuum action. The base storage section is mounted on a carrying stand which is independently movable and is removably attached to the base plate conveyor.

20 Claims, 8 Drawing Sheets

FIG. 11d

BASE PLATE CONVEYOR

BACKGROUND OF THE INVENTION

The present invention relates to an art of conveyance, more particularly to an art of effectively conveying a base plates.

A printed circuit board for an electronic machine such as a computer has an electrically insulating base plate provided with a wiring pattern on at least one side of the base plate. The wiring pattern is made of a copper film, for example. The printed circuit board is manufactured in a process described from now on. The electrically insulating base plate is first supplied from a base plate feeder to the first-stage portion of a base plate conveyance passage on a base plate conveyor. The base plate is coated with the copper film nearly all over the plate in advance. The conveyor conveys the base plate to a laminator which is an automatic thin film sticking apparatus by which a resist film, which is a photosensitive resin film, and a cover film, which is a light-transmissible resin film for protecting the resist film, are automatically stuck to the surface of the copper film on the base plate. The base plate conveyor thereafter conveys the base plate to a resist film exposure appliance which functions so that a latent image of the wiring pattern is made in the resist film stuck to the base plate. The conveyor then conveys the base plate to an automatic thin film peeling appliance by which the cover film laminated of the resist film on the base plate is automatically peeled therefrom. The conveyor then conveys the base plate to a resist film developing appliance which develops the latent image in the resist film so that a mask is created. The conveyor thereafter conveys the base plate to an etching appliance which partly etches the copper film through the mask so that the wiring pattern is made of the unetched portions of the copper film. After that, the base plate is subjected to various plating steps and an electrically insulating film providing step so that the printed circuit board is completed. At the last-stage portion of the base plate conveyance passage, the base plate conveyor conveys the printed circuit board to a printed circuit board receiver so that the board is housed therein, thus finishing the process of manufacturing the board.

It is ideal that the plural processing appliances are sequentially disposed along the base plate conveyance passage on the base plate conveyor to make the consistent process of the manufacturing of the printed circuit board. However, since each of the processing appliances is large in size and occupation area, the process of manufacturing of the printed circuit board is usually made inconsistent and divided into a plurality of portions in reality. In other words, the base plate conveyor is usually divided into a plurality of portions, along the base plate conveyance passages on which the processing appliances are disposed. The divided portions of the conveyor are built in the processing appliances or connected as external units thereto. The base plate feeder for supplying the electrically insulating base plate is disposed at the base plate conveyance passage on the first-stage portion of the divided conveyor. The printed circuit board receiver for receiving the printed circuit board is disposed at the base plate conveyance passage on the last-stage portion of the divided conveyor. In each of the base plate feeder and the base plate receiver, a plurality of electrically insulating base plates or printed circuit boards are piled together in such a manner that the reverse side of one base plate, on which the wiring pattern is made, is put in contact with the obverse side of another base plate. For that reason, very high load acts to the obverse side of the lowermost of the piled base plates so that the resist film of the wiring pattern on the lowermost base plate is likely to be damaged due to pressure of even a minute mutual displacement between the base plate in the piling thereof. This is a problem.

It is conceivable that a housing rack system, in which the electrically insulating base plates or the printed circuit boards are housed in a leant state in grooves provided at prescribed intervals in a housing rack, is adopted for each of the base plate feeder and the printed circuit board receiver in order to solve the problem. However, since one edge of each of the base plates is put in the groove of the housing rack in the housing rack system, the base plate buckles too much to be housed in the groove if the thickness of the base plate is small. This is another problem.

Since the completed circuit board housed in the printed circuit board receiver needs to be transferred therefrom to a printed circuit board feeder provided at the first-stage portion of another divided process, it is not only time-consuming to transfer the board to the feeder but also the resist film or/and wiring pattern of the board is likely to be damaged. This is yet another problem.

SUMMARY OF THE INVENTION

It is an object of the present invention to provide an art of conveying a base plate so that the likelihood of damaging the surface of the base plate or a film on the surface at the time of housing of the base plate is lowered regardless of the thickness thereof.

It is another object of the present invention to provide an art of conveying a base plate so that the likelihood of damaging the surface of the base plate of a film on the surface at the time of transfer of the base plate is lowered.

It is yet another object of the present invention to provide an art of conveying a base plate so that the time of transfer thereof is shortened.

Other objects and novel features of the present invention will be apparent by referring to the description hereinafter and the drawings attached hereto.

The above-mentioned problems can be solved by embodiments of the present invention.

One of the embodiments is a base plate conveyor (1) for supplying a base plate from a base plate storage section at one end of a base plate conveyance passage to the conveyance surface of the passage or receiving the base plate from the passage to the storage section. The conveyor is characterized by including the base plate storage section in which a plurality of base plates can be piled so that the base plates are leant against the inside of the section and the conveyed surface of the base plates have a prescribed angle to the conveyance surface of the conveyance passage; and a base plate mover provided at the casing of the conveyor so as to automatically move the base plate from the storage section to the conveyance passage or from the conveyance passage to the storage section.

Another of the embodiments is a base plate conveyor (2) according to the former (1) and characterized in that the base plate mover includes a vertically swung arm member, which is vertically swung between the base plate storage section and the base plate conveyance passage; and the arm member is provided with a suction means for sucking the conveyed surface of the base plate by vacuum action so that the base plate is held.

Yet another of the embodiments is a base plate conveyor (3) according to the former (2) and characterized in that the vertically swung arm member of the base plate mover is swung and translated to move the base plate; and a means for automatically changing the quantity of the translation of the arm member depending on the number of the base plates piled in the base plate storage section is provided.

Yet another of the embodiments is a base plate conveyor (4) according to the former (2) or (3) and characterized in that the vertically swung member is provided with a sensor for controlling the sucking action of the suction means.

Yet another of the embodiments is a base plate conveyor (5) according to the former (1), (2), (3) or (4) and characterized in that the base plate storage section is mounted on a carrying stand which is independently movable and is removably attached to the base plate conveyor.

Yet another of the embodiments is a base plate conveyor (6) according to the former (4) or (5) and characterized in that the base plate storage section is made of a box open at least in the portion thereof, through which the base plate is supplied; the vertically swung arm member is provided with a photosensor for controlling the sucking action of the suction means; and the base plate storage portion of the box has a through hole, through which light from the photosensor is transmitted so as to cease the sucking action of the suction means.

BRIEF DESCRIPTION OF THE DRAWINGS
Accompanying the drawings.

DETAILED DESCRIPTION OF THE PREFERRED EMBODIMENTS

An embodiment of the present invention is hereinafter described in detail with reference to the drawings attached hereto. Mutually equivalent portions shown if the drawings are denoted by the same reference symbols therein, and not described in detail again if one portion in each group is once described in detail.

Figure 2:
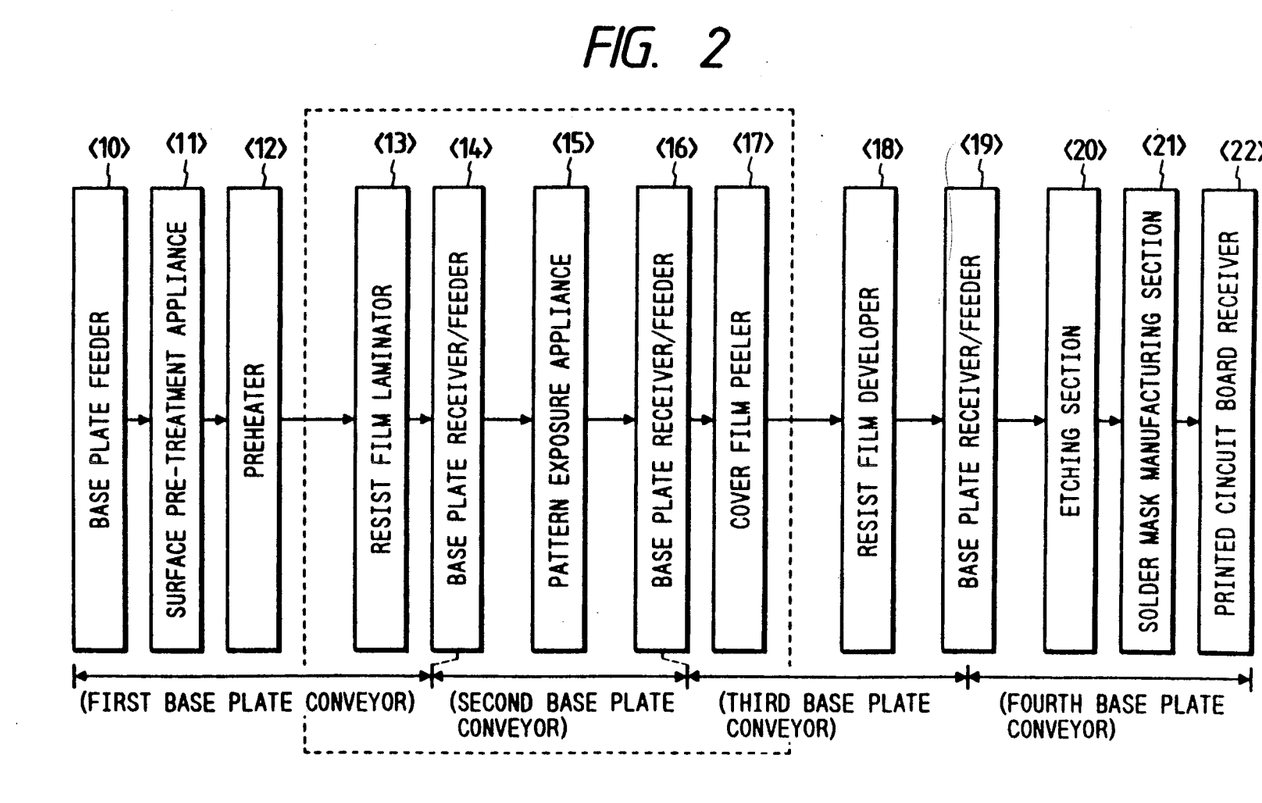
FIG. 2 is a block diagram of the outline of a printed circuit board manufacturing system to which the base plate conveyor is applied.

FIG. 2 is a block diagram of the outline of a printed circuit board manufacturing system to which base plate conveyors, each of which is the embodiment, is applied. In the process of manufacturing a printed circuit board in the system, one of the electrically insulating base plates housed in a base plate feeder 10 is first conveyed therefrom to a surface pretreatment appliance 11 by the first base plate conveyor not concretely shown in FIG. 2. An electroconductive film is provided on the substantially entire area of at least one side of each of the electrically insulating plates in advance. The film is made of copper, for example, in order to make a prescribed wiring pattern on the electrically insulating base plate afterwards. The surface pre-treatment appliance 11 heightens the flatness of the surface of the base plate, and activates and cleans up the electroconductive film.

The base plate is conveyed from the surface pre-treatment appliance 11 to a preheater 12 by the first base plate conveyor. The preheater 12 appropriately preheats the base plate, especially the surface of the electroconductive film thereon to make it easier to stick a resist film to the electroconductive film in the following step of the base plate manufacturing process. The base plate is conveyed from the preheater 12 to a resist film laminator 13 by the first base plate conveyor. The resist film, which is a photosensitive resin film, is automatically stuck to the surface of the electroconductive film on the base plate by the laminator 13 which is an automatic thin film sticking appliance. At that time, a stratified body consisting the resist film and a cover film, which is a light-transmissible resin film and protects the resist film, is stuck to the electroconductive film by the laminator 13.

The base plate is conveyed from the resist film laminator 13 to a base plate receiver 14 by the first base plate conveyor and temporarily housed in the receiver. The receiver 14 is then used as a base plate feeder so that the base plates housed in the receiver are sequentially supplied therefrom to a pattern exposure appliance 15 by the second base plate conveyor not concretely shown in FIG. 2. At that time, the stratified body consisting of the resist film and the cover film is already stuck to the electroconductive film on the base plate. The pattern exposure appliance 15 functions so that a latent image of the wiring pattern is made in the resist film on the electroconductive film on the base plate.

After that, the base plate is conveyed from the pattern exposure appliance 15 to a base plate receiver 16 by the second base plate conveyor so that the base plate is temporarily housed in the receiver. The base plate receiver 16 is then used as a base plate feeder so that the base plate is supplied therefrom to a cover film peeler 17 by the third base plate conveyor not concretely shown in FIG. 2. The cover film peeler 17 is an automatic thin film peeling appliance and functions so that only the cover film of the stratified body stuck to the electroconductive film on the base plate is peeled therefrom.

The processing and conveyance of the base plate, which start with the sticking of the resist film thereto by the resist film laminator 13 and end with the peeling of the cover film therefrom by the cover film peeler 17 as shown by a dotted line in FIG. 2, are performed in such special environment that the resist film is not exposed to light.

The base plate is conveyed from the cover film peeler 17 to a resist film developer 18 by the third base plate conveyor. The resist film developer 18 develops the latent image in the resist film on the electroconductive film on the base plate so that the unnecessary portions of the resist film are removed and the other necessary portions thereof constitute an etching mask.

After that, the base plate is conveyed from the resist film developer 18 to a base plate receiver 19 by the third base plate conveyor so that the base plate is temporarily housed in the receiver. The base plate receiver 19 is then used as a base plate feeder so that the base plate is supplied therefrom to an etching section 20 by the forth base plate conveyor not concretely shown in the drawings. The etching section 20 functions so that a chemical liquid is sprayed over the electroconductive film on the base plate through the etching mask to partly etch the film. The unetched remaining portions of the electroconductive film are used as wiring.

After that, the base plate is conveyed from the etching section 20 to a solder mask manufacturing section 21 by the fourth base plate conveyor. The solder mask manufacturing section 21 functions so that a solder mask, which is an electrically insulating film, is made on the wiring on the base plate, thus completing the printed circuit board.

The completed printed circuit board is conveyed to a printed circuit board receiver 22 by the fourth base plate conveyor.

The above-described series of manufacturing steps are thus taken so that the process of manufacturing of the printed circuit board is finished.

The conveyance of the electrically insulating base plate, which starts after the development of the latent image in the resist film stuck to the electroconductive film on the base plate, may not be performed by the third and the fourth base plate conveyors but may be performed manually.

Figure 1:
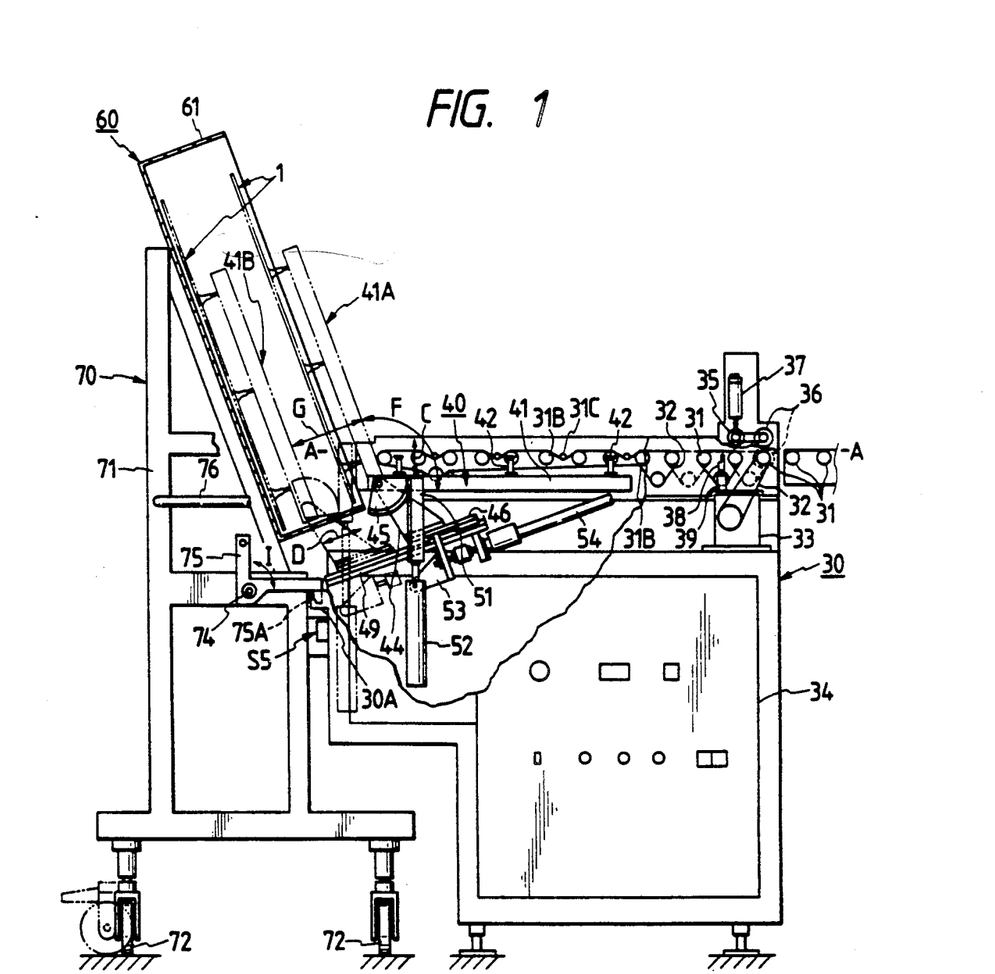
FIG. 1 is a sectional view of a major part of a base plate conveyor which is an embodiment of the present invention.
Figure 3:
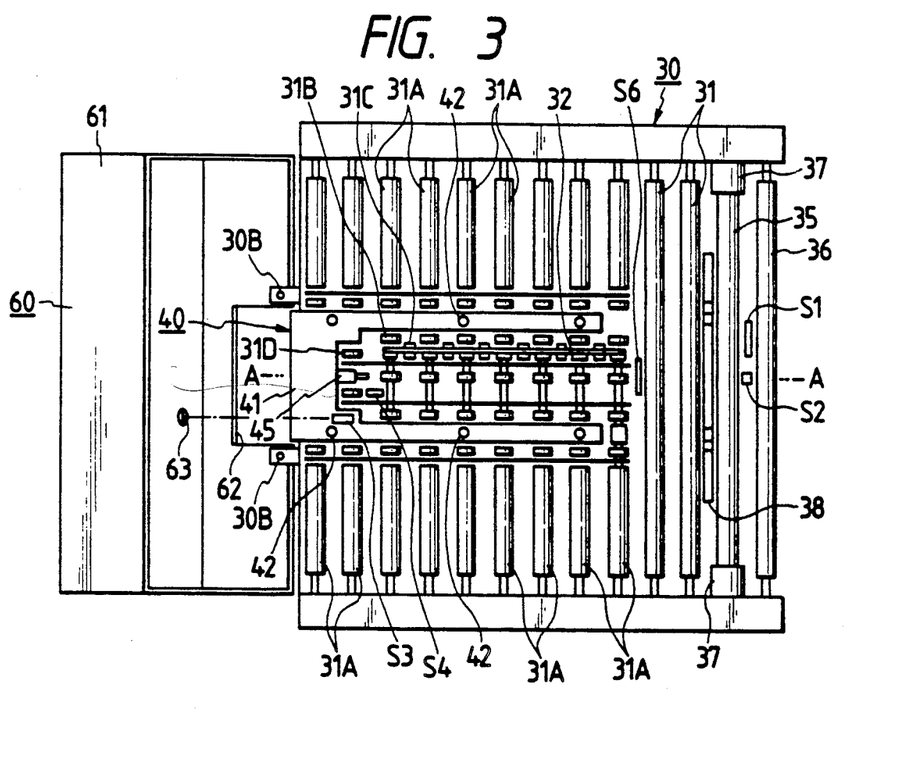
FIG. 3 is a plane view of a major part of the base plate conveyor.
Figure 4:
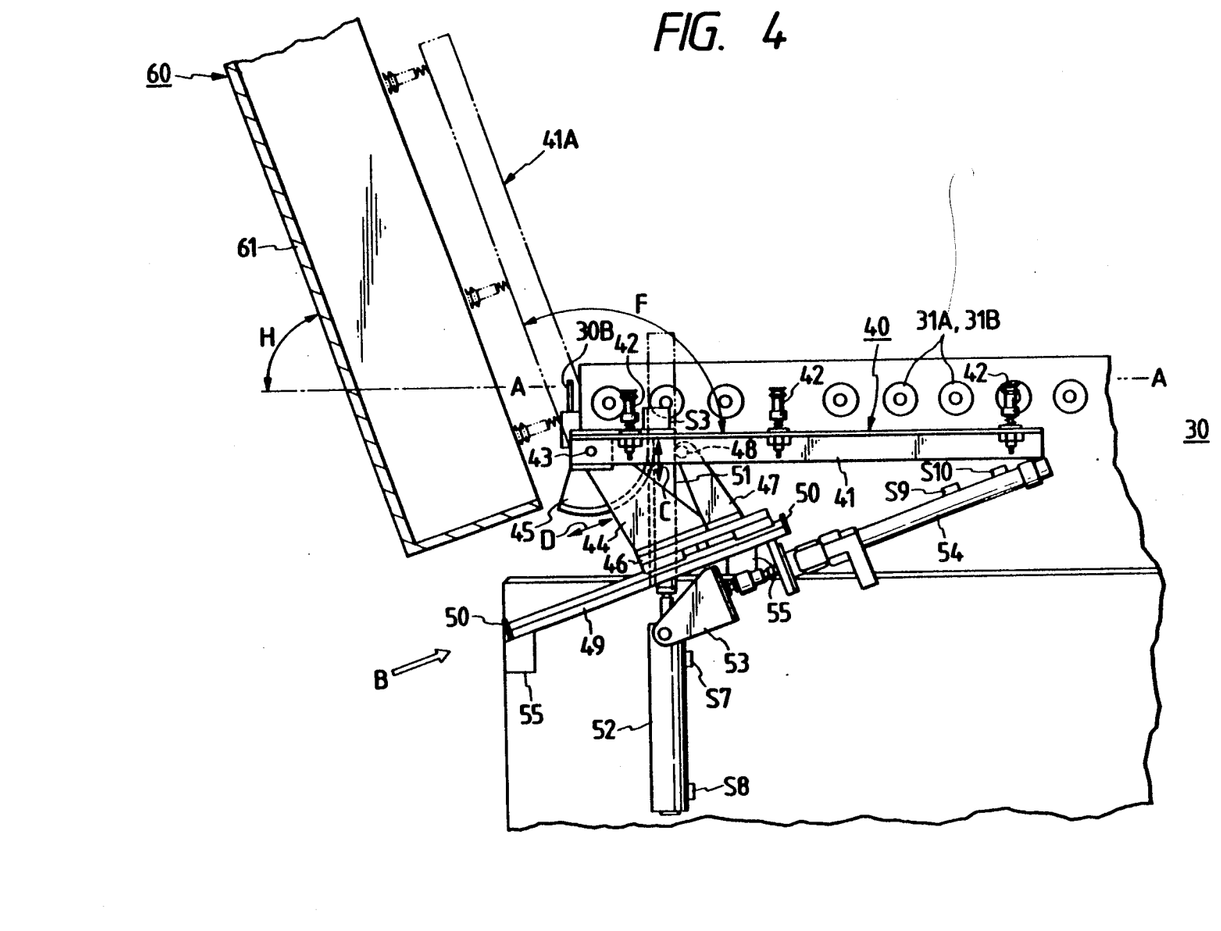
FIG. 4 is an enlarged sectional view of a major part of the base plate conveyor.

The constitution and operation of each of the base plate conveyors are described in detail from now on, with reference to FIG. 1, which is a sectional view of a major part of the conveyor, FIG. 3, which is a plan view of a major part thereof, and FIG. 4, which is an enlarged sectional view of a major part thereof. Since the base plate feeder, base plate receiver and printed circuit board receiver of the base plate conveyor are substantially the same as each other in constitution and operation, only the base plate feeder is described hereinafter with regard to the constitution and operation thereof.

Each of the base plate conveyors 30 shown in FIGS. 1, 2, 3 and 4 conveys the electrically insulating base plate 1 or the printed circuit board 1 in a base plate conveyance passage A—A as shown in FIGS. 1, 3 and 4. The conveyance is performed rightward with regard to FIGS. 1, 3 and 4. The conveyance surface of the passage A—A is substantially horizontal. A plurality of conveyance rollers 31 are provided at prescribed intervals along the conveyance passage A—A. Each of the conveyance rollers 31 is rotatably supported at both the ends thereof to the support frame of the base plate conveyor 30 as shown in FIG. 3. A transmission belt 32, which is also a timing belt, is engaged on each pair of the conveyance rollers 31 adjacent to each other along the base plate conveyance passage A—A, as shown in FIG. 1, so that torque is transmitted from one of the rollers to the other. Predetermined one of the conveyance rollers 31 is connected to the drive shaft of a motor 33 through a transmission belt 32 as shown in FIG. 1. The motor 33 is attached to the casing of the base plate conveyor 30 near the conveyance passage A—A. All the conveyance rollers 31 of the conveyor 30 are driven by the motor 33. A controller 34 for regulating the motor 33 and so forth is provided on the casing of the conveyor 30. As shown in FIG. 1, a transmission gear 36 is provided at one end of the conveyance roller 31 directly connected to the driven shaft of the motor 33 by the transmission belt 32. A pinch roller 35 is provided near the transmission gear 36 and connected thereto by a transmission belt. The pinch roller 35 is disposed over the conveyance roller 31 adjacent to the other conveyance roller 31 directly connected to the motor 33. Pneumatic cylinders 37 can move the pinch roller 35 toward and away from the conveyance roller 31, over which the pinch roller is disposed, to pinch the base plate 1 under appropriate pressure while the plate is conveyed. When the pinch roller 35 is used as a base plate reception member and the base plate is conveyed leftward with regard to FIG. 1, the pinch roller acts to pull the base plate into the base plate conveyor 30 from the other base plate conveyor built in a base plate processing appliance or connected thereto, to smoothly convey the base plate at the joint of the conveyance passage A—A. The conveyance of the base plate 1 is temporarily stopped at the joint of the conveyance passage A—A as described hereinafter. The pinch roller 35 can be also used as a base plate feed member when the base plate 1 is conveyed rightward with regard to FIG. 1.

As shown in FIGS. 1 and 3, a base plate stopper 38 is provided at the left-hand side (with regard to FIG. 1) of the pinch roller 35 so that the stopper can be vertically moved between the conveyance passage A—A and a position thereunder, by a pneumatic cylinder 39, to stop the base plate 1 conveyed in the passage.

As shown in FIG. 3, sensor S1 and S2 are provided at the right-hand side of the pinch roller 35. The sensor S1 is a light-reflection-type sensor and disposed near the conveyance passage A—A to detect the presence of the base plate 1. The sensor S2 is an electrostatic-capacity-type sensor, for example, and disposed near the conveyance passage A—A to detect the thickness of the conveyed base plate 1 or the dimension thereof in the direction of the conveyance thereof.

As shown in FIG. 3, divided conveyance rollers 31A and 31B, which are the mutually divided portions of a number of the conveyance rollers 31, are disposed on the base plate conveyance passage A—A at the base plate feed side of the base plate conveyance 30. The plural divided conveyance rollers 31B extend on the central portion of the conveyance passage A—A and are disposed at intervals in the direction of the conveyance of the base plate 1. The other plural divided conveyance rollers 31A extend on the conveyance passage A—A at both the sides of the divided conveyance rollers 31B and are disposed at intervals in the direction of the conveyance of the base plate 1. The torque of the other conveyance rollers 31 is transmitted to the divided conveyance rollers 31A through transmission belts 32 not shown in the drawings, so that the divided rollers 31A are rotated substantially in the same manner as the rollers 31. At least one of the divided conveyance rollers 31B is connected to the rotary shaft of the other divided conveyance roller 31A so that the divided conveyance roller 31B is used as a drive roller to rotate the other plural divided conveyance rollers 31B through the transmission belt 32 which transmits torque to the divided conveyance roller 31B and receives an appropriate tensile force from a roller 31C to ensure the transmission of the torque to the divided conveyance roller.

As shown in FIG. 3, idle rollers 31D are rotatably supported.

Figure 5:
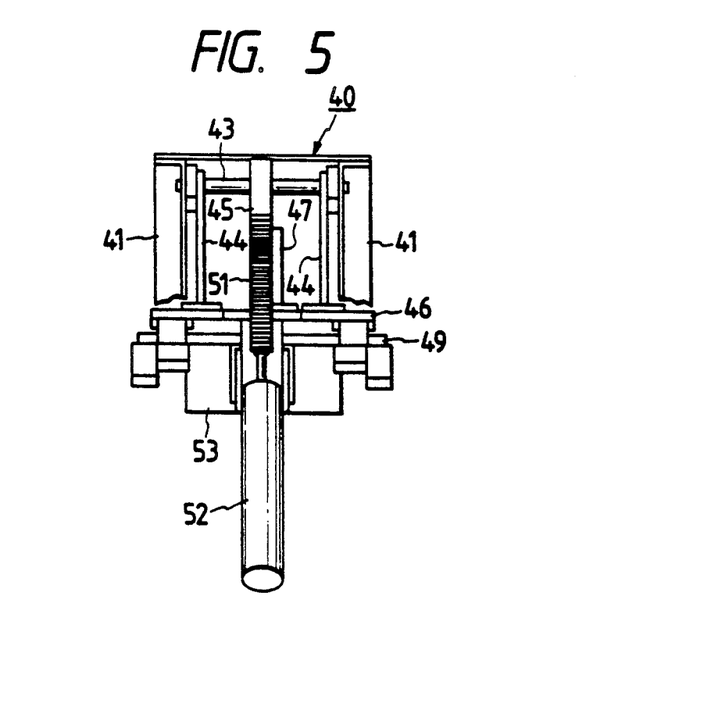
FIG. 5 is a side view of a major part of the base plate conveyor seen along an arrow B if FIG. 4.

A base plate mover 40 is provided at the feed side of the base plate conveyor 30 as shown in FIGS. 1, 3 and 4 and FIG. 5 which is a side view of a major part of the base plate conveyor seen along an arrow B shown in FIG. 4. The base plate mover 40 is located near the central portion of the base plate conveyance passage A—A. The base plate mover 40 mainly includes a vertically swung arm member 41, base plate suction member 42, and a vacuum pump connected to the suction members. The arm member 41 is rotatably supported at one end thereof by a rotary shaft 43 at one end of the base plate conveyance passage A—A, as shown in FIG. 1, 4 and 5, so that the arm member extends in the direction of feed of the base plate 1 along the conveyance passage and the other ends of the arm member are usually located between the divided conveyance rollers 31A and 31B and can be freely swung up and down. The rotary shaft 43 is supported at both ends thereof by the support frames 44. A pinion 45 is secured to the central portion of the rotary shaft 43 and engaged with a rack 51, which is moved up and down by a pneumatic cylinder 52 as shown by arrows C in FIG. 1. The support frames 44 are secured to a moving base 46, which functions so that guide and support members 49 secured with interposed support members 55 to the casing of the base plate conveyor 30 so as to be slightly inclined are moved rightward and leftward as shown by arrows D in FIGS. 1 and 4. The angle of the inclination of each guide and support members 49 corresponds to that of the inclination of a base plate feeder 60 which is a base plate storage section and hereinafter described. The angle is preset at 10 to 30 degrees to the base plate conveyance passage A—A. The moving base 46 is connected with an interposed base support frame 53 to a pneumatic cylinder 54, which moves the moving base in the directions of the arrows D shown in FIG. 4. Stoppers 50 for predetermining the quantity of the movement of the moving base 46 in the directions of the arrows D are provided at the ends of the guide and support members 49. A rack support member 48 is provided on a support frame 47 on the moving base 46 so as to always keep the pinion 45 and the rack 51 engaged with each other. The pneumatic cylinder 52 is provided with sensors S7 and S8 for detecting the moved position of the piston rod of the cylinder. The pneumatic cylinder 54 is provided with sensors S9 and S10 for detecting the moved position of the piston rod of the cylinder.

Figure 6:
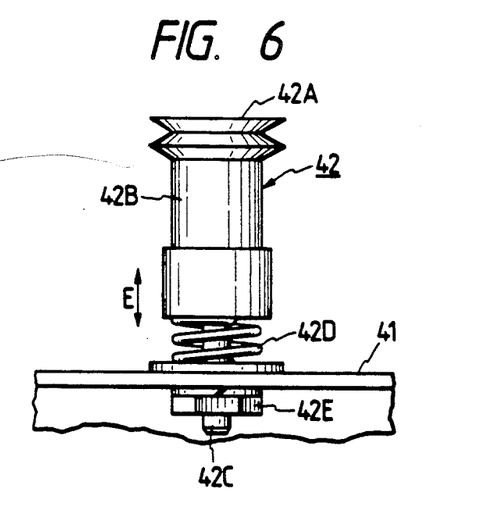
FIG. 6 is an enlarged view of a major part of the base plate suction member of the base plate mover of the base plate conveyor.

The base plate suction members 42 are secured to the vertically swung arm member 41, as shown in FIG. 6 which is an enlarged view of a major part of the base plate conveyor 30. Each of the base plate suction members 42 mainly includes a suction body 42B, a sucker 42A, a sliding shaft 42C, a securing nut 42E and an elastic member 42D which is a helical spring. The sucker 42A is connected to the vacuum pump through the suction body 42B so that the electrically insulating base plate 1 is sucked by the sucker under the sucking action of the vacuum pump. The suction body 42B is supported by the sliding shaft 42C so that the suction body can be moved substantially perpendicularly to the surface of the vertically swung arm member 41 as shown by arrows E in FIG. 6. The quantity of the movement of the suction body 42B is controlled by the elastic member 42D. The number of the base plate suction members 42, which are disposed on the arm member 41, is six as shown in FIG. 3, but is not confined thereto.

Figure 7:
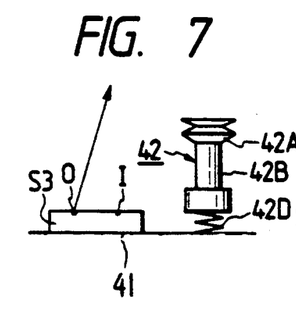
FIG. 7, 8 and 9 are schematic views indicative of manners of detection by a sensor attached to the base plate mover.
Figure 8:
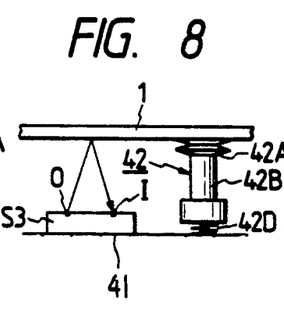
Figure 9:
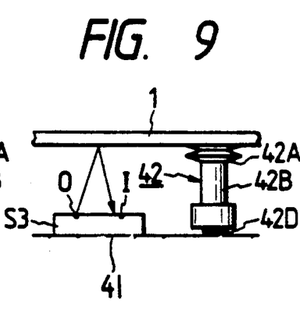

As shown in FIG. 3, a sensor S3 is provided on the arm member 41 near one of the base plate suction members 42. The sensor S3 is a light-reflection-type sensor, and comprises a light emitter O and a light receiver I which receives light emitted from the emitter. The position of the base plate 1 is detected by the sensor S3 as shown in FIGS. 7, 8 and 9. FIG. 7 shows the state that the base plate 1 is not in a sucked position and the light emitted at a prescribed angle from the light emitter O of the sensor S3 is not reflected by the base plate toward the light receiver I. In that state, the light receiver I of the sensor S3 does not receive the light, so that the sensor sends out a signal by which a suction means composed of the base plate suction member 42 and the vacuum pump is put out of action. FIG. 8 shows the state that the base plate 1 is in the sucked position and the light emitted at the prescribed angle from the light emitter O of the sensor S3 is reflected by the surface of the base plate toward the light receiver I of the sensor. In that state, the light receiver I of the sensor S3 receives the light, so that the sensor sends out a signal by which the suction means is put in action. FIG. 9 shows the state that the base plate 1 is in an improperly sucked position and the light emitted at the prescribed angle from the light emitter O of the sensor S3 is reflected by the surface of the base plate but does not reach the light receiver I of the sensor. In that state, the light receiver I of the sensor S3 does not receive the light from the light emitter thereof, so that the sensor sends out a signal by which the suction means is put out of action.

When the rack 51 is moved by the pneumatic cylinder 52 as shown by the arrows C in FIGS. 1 and 4, the vertically swung arm member 41 of the base plate mover 40 is vertically swung between the base plate conveyance passage A—A and the base plate storage section 60 as shown by arrows F in FIGS. 1 and 4. In other words, the arm member 41 can be vertically swung between a position 41 and another position 41A. The angle of the swing of the arm member 41 is preset at about 100 to 120 degrees because the surface of the base plate conveyance passage A—A is substantially horizontal and the base plate storage surface of the base plate storage section 60 has an inclination angle H of 60 to 80 degrees to the conveyance passage as shown in FIG. 4. the swing of the arm member 41 in the directions of the arrows F is automatically performed as described hereinafter.

Since the base support frame 53 is moved by the pneumatic cylinder 54 as shown by the arrows D in FIGS. 1 and 4, the base plate mover 40 is regulated to the guide and support member 49 so that the vertically swung arm member 41 is translated, between the position 41A and a position 41B, in the directions of arrows G through the action of the moving base 46, the support frames 44 and the rotary shaft 43. Because of the translation, the base plates 1 housed in the base plate storage section 60 are sequentially taken out therefrom or the base plates 1 are sequentially housed therein, the translation of the arm member 41 is automatically performed as described hereinafter. The quantity of the translation of the member 41 is automatically altered depending on the number of the base plates 1 housed in the storage section 60.

The base plate storage section 60 is disposed at the base plate feed end of the base plate conveyance passage A—A on the base plate conveyor 30, as shown in FIGS. 1, 3 and 4 and FIG. 10 which is a perspective view of a major part of the base plate conveyor. The base plate storage section 60 is made of a rectangularly shaped box 61 open in the portion thereof, through which the base plate 1 is supplied or received through the action of the vertically swung arm member 41 of the base plate mover 40. For example, the box 61 is made of a plastic or a light metal, which has an appropriate hardness. A plurality of electrically insulating base plates 1 are housed in the box 61. The box 61 has the inclination angle H to the surface of the base plate conveyance passage A—A so that the base plates 1 can be housed in a leant state in the box. The box 61 has a notch 62 near the base plate mover 40 so that the mover is prevented from coming into contact with the box. The box 61 may be open in the top thereof as well as in the portion thereof, through which the base plate 1 is supplied or received. Besides, the box 61 may be open in all of the top, above-mentioned portion and side walls thereof so as to look L-shaped when seen sideward.

Figure 10:
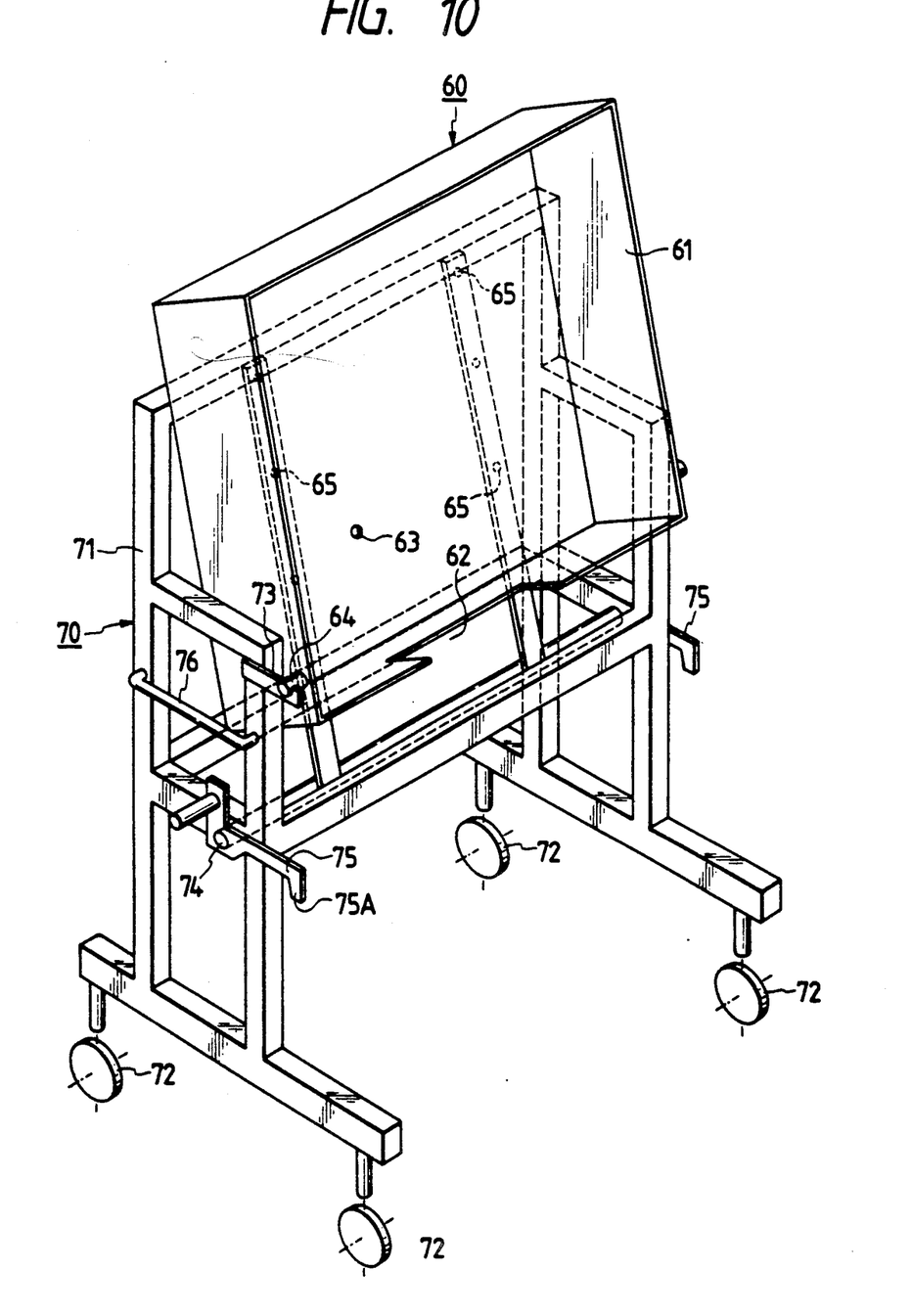
FIG. 10 is a perspective view of the base plate feeder or receiver and carrying stand of the base plate conveyor.
Figure 11A:
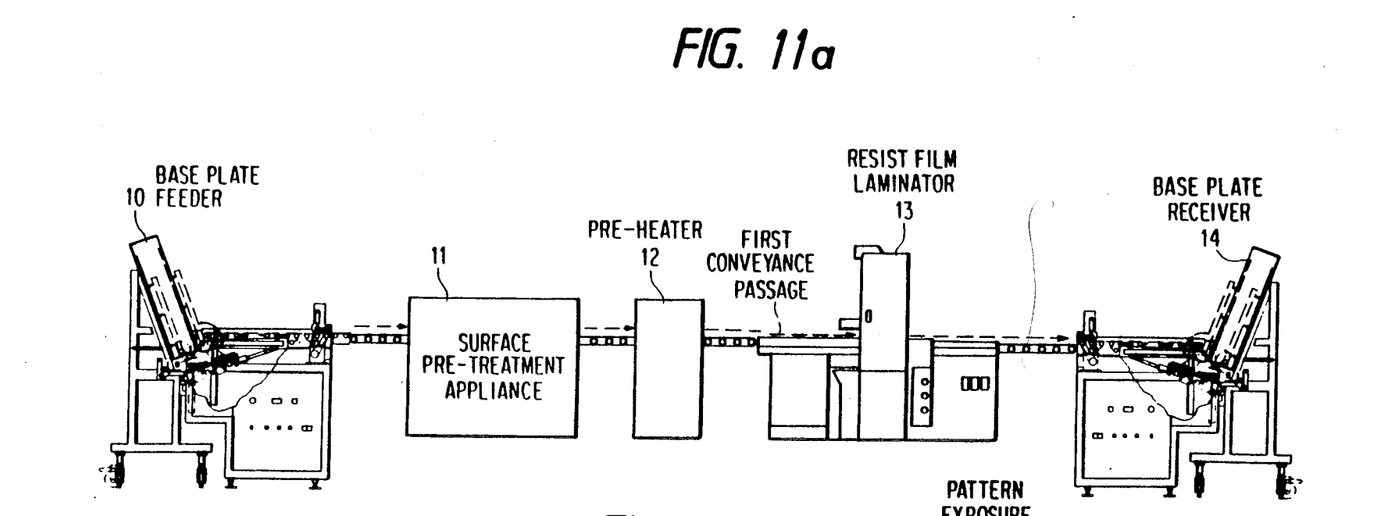
FIGS. 11a through 11d are side views of the printed circuit board manufacturing system according to the block diagram of FIG. 2.
Figure 11B:
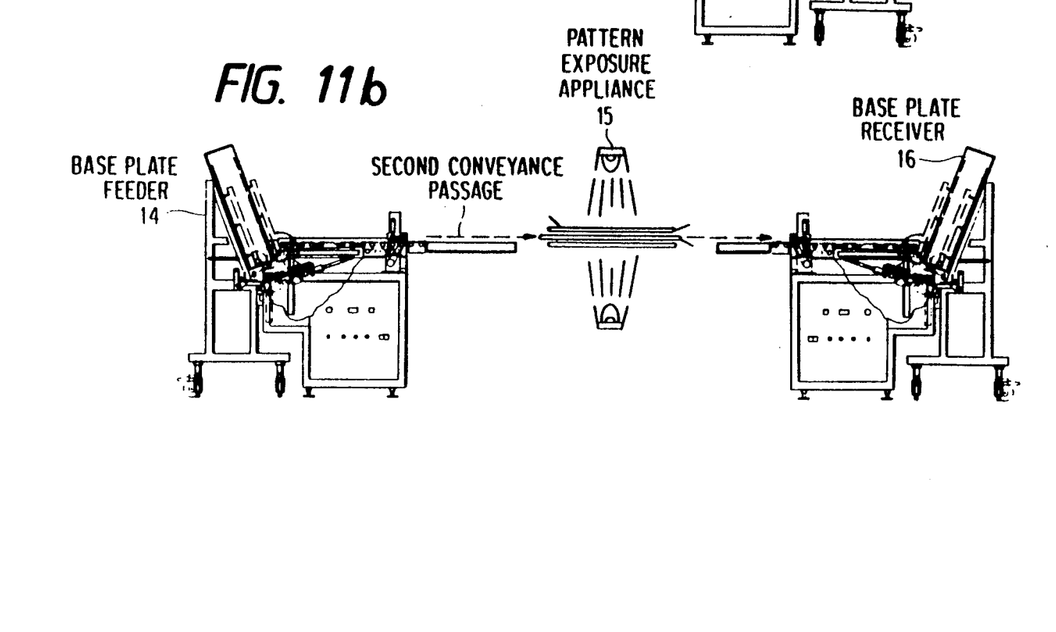
Figure 11C:
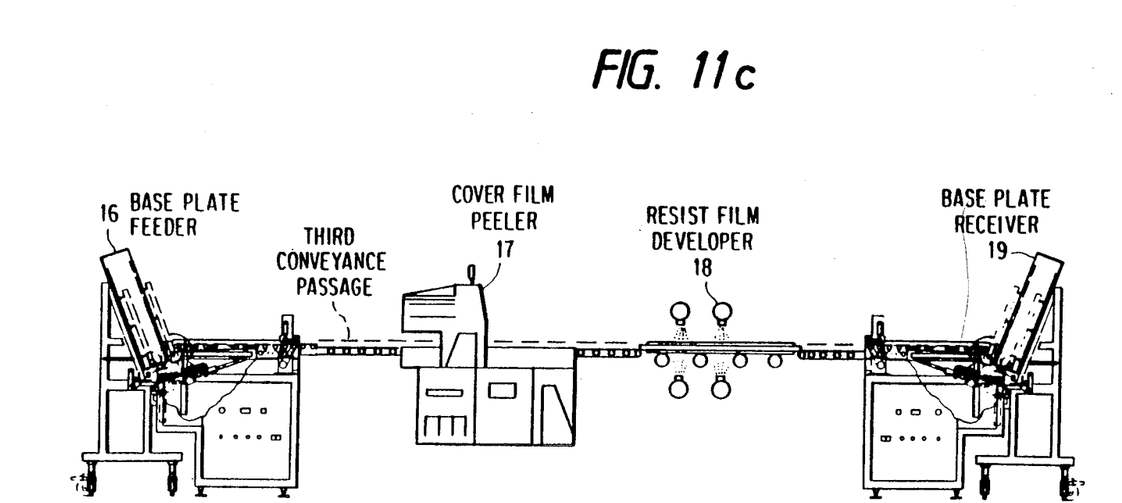
Figure 11D:
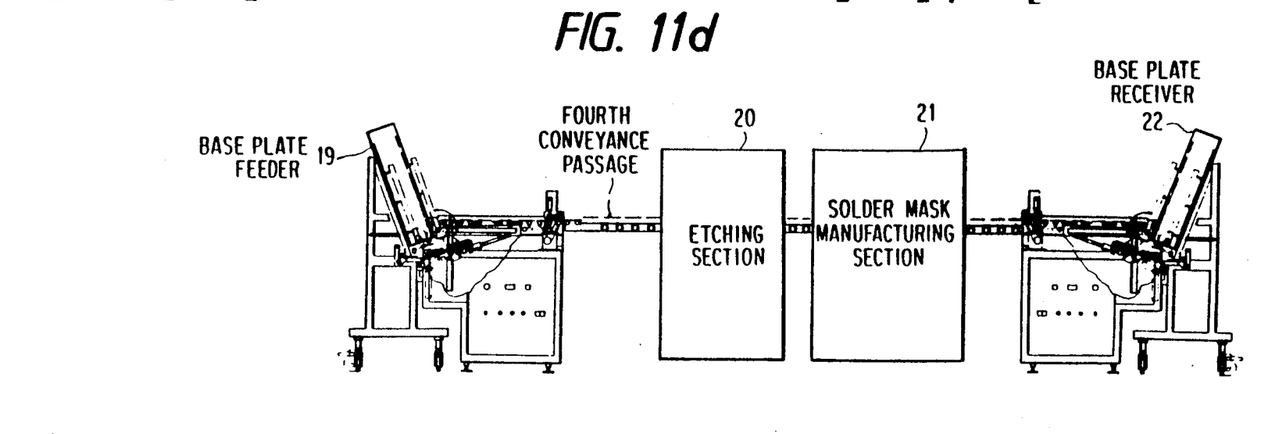

As shown in FIGS. 3 and 10, the box 61 has a through hole 63 in the base plate storage surface thereof, the through hole 63 is in such a position that the sensor S3 disposed on the vertically swung arm member 41 of the base plate mover 40 is opposed to the hole when the arm member has approached the box 61 because of being swung in the direction of the arrow F and translated in the direction of the arrow G. When the base plate 1 is not present in the box 61, the light emitted from the light emitter O of the sensor S3 is transmitted through the through hole 63 so as to put the base plate suction members 42 out of sucking action.

As shown in FIGS. 1 and 10, base plate storage section 60 is mounted on a carrying stand 70 in such a manner that the section is supported at the supported portions 64 of the box 61 by support member 73 attached to the stand and the box is secured to the stand by screws 65 or the like. Although the base plate storage section 60 is fixedly attached to the carrying stand 70 in this embodiment, the present invention is not confined thereto but may be otherwise embodied so that the storage section is removably attached to the stand.

The carrying stand 70 supports the base plate storage section 60 at the inclination angle H, and can be moved independently of the body of the base plate conveyor 30 because the stand is provided with casters 72 having brakes and attached to the bottom of the frame 71 of the stand, the number of the casters 72 is four as shown in FIG. 10, but is not confined thereto, the frame 71 is provided with handles 76 for the operating person to easily move the carrying stand 70. The frame 71 is fitted with fasteners 75 for optionally attaching the stand 70 to the base plate conveying unit 30, the fasteners 75 are supported by a rotary shaft 74 so that the fasteners can be tuned in the directions of arrows I shown in FIG. 1. The coupling portions 75A of the fasteners 75 are connected to those 30A of the base plate conveyor 30 so that the base plate storage section 60 mounted on the carrying stand 70 at the end of the base plate conveyance passage A—A on the conveyor is firmly held. The conveyor 30 is provided with a proximity sensor S5 near the joint of the coupling portions 75A and 30A so as to find out whether the storage section 60 is properly mounted at the end of the conveyance passage A—A on the conveyor 30 or not.

As shown in FIG. 3, sensors S4 and S6 are provided near the base plate conveyance passage A—A. The sensor S4 is a light-reflection-type sensor for detecting whether the base plate 1 is present on the vertically swung arm member 41 of the base plate mover 40 or not when the arm member is in the conveyance passage A—A. The sensor S6 is a light-reflection-type sensor for detecting the position of the end of the base plate 1 to be conveyed in the passage A—A.

As shown in FIG. 3, stoppers 30B are provided at the end of the conveyance passage A—A near the storage section 60. The stoppers 30B are moved to and from the conveyance passage A—A by pneumatic cylinders to prevent the base plate 1 from falling off the passage, the pneumatic cylinders are put in action on the basis of the detection output signal from the sensor S4.

The base plate feed action of the base plate conveyor 30 provided with the base plate storage section 60 as a loader is described from now on. As shown in FIG. 1, the storage section 60 is first mounted on the conveyor 30 at the first-stage portion of the base plate conveyance passage A—A. In other words, as shown in FIG. 2, the storage section 60 may be selectively mounted on any one of the first, second, third and fourth base plate conveyors at the first-stage portions of the base plate conveyance passage A—A thereof. A plurality of the electrically insulating base plates 1 to be processed are housed in a leant state in the box 61 of the storage section 60 in advance. The storage section 60 is secured to the carrying stand 70, which is connected to the body of the conveyor 30 by inserting the coupling portions 75A of the fasteners 75 into those 30A of the conveyor, the connection is detected by the proximity sensor S5. The power switch of the conveyor 30 is then turned on. The motor 33 is driven through the turning-on of the power switch and the detection output signal from the proximity sensor S5 so that the conveyance rollers 31, 31A and 31B shown in FIGS. 1 and 3 are rotated.

The position of the piston of the pneumatic cylinder 52 of the base plate mover 40 shown in FIG. 4 is detected by the sensor S8 so that the cylinder is driven on the basis of the output detection signal from the sensor. As a result, the rack 51 coupled to the piston of the cylinder 52 is moved upward as shown by the arrow C so that the arm member 41 is swung up through the action of the pinion 45 and the rotary shaft 43 as shown by the arrow F.

When the arm member 41 is swung up, the position of the piston of the cylinder 52 is detected by the sensor S7 so that the pneumatic cylinder 54 is driven on the basis of the output detection signal from the sensor. At that time, the cylinder 54 pushes down the moving base 46 along the guide and support members 49 through the action of the base support frame 53 so that the arm member 41 is translated toward the box 61 of the base plate storage section 60 as shown by the arrow G in FIG. 1. The suction means is put in action along with the translation of the arm member 41. When the arm member 41 has approached the surface of the uppermost of the electrically insulating base plates 1 housed in the leant state in the storage section 60, the sensor S3 shown in FIG. 3 reacts.

At that time, if the light emitted from the light emitter O of the sensor S3 is reflected by the surface of the base plate 1 to the light receiver I of the sensor due to the translation of the arm member 41 in the direction of the arrow G as shown in FIG. 8, the translation is stopped by a brake means provided for the piston of the pneumatic cylinder 54.

The stoppage of the translation of the arm member 41 is performed when the sucking portions 42A of the base plate suction members 42 have come into contact with the surface of the base plate 1.

The sensor S3 may be made of a limit switch which is a microswitch for detecting a position by mechanical contact. When the sucking portions 42A of all the base plate suction members 42 on the arm member 41 have come into contact with the surface of the base plate 1 and begun to exert prescribed sucking power, the translation of the arm member is resumed in the reverse direction.

To detect the prescribed sucking power, a vacuum gauge is provided in a suction line between the vacuum pump and the base plate suction members 42 so as to judge whether the reading of the gauge has reached a prescribed level or not.

As shown in FIG. 1, after the resumption of the translation of the arm member 41, the member is translated away from the base plate storage section 60 in the direction of the arrow G by the pneumatic cylinder 54 as the base plate 1 remains sucked on the suction members 42.

When the piston of the pneumatic cylinder 54 is detected by the sensor S9, the drive of the pneumatic cylinder 52 is started on the basis of the detection output signal from the sensor. The sensor S9 is disposed at the halfway part of the stroke of the piston of the cylinder 54. The rack 51 is moved down by the cylinder 52 as shown by the arrow C, so that the arm member 41 is swung down in the direction of the arrow F. After the return of the piston of the cylinder 54 to the original position thereof is detected by the sensor S10, the base plate 1 sucked by the base plate suction members 42 on the arm member 41 is moved to the base plate conveyance passage A—A and the return of the piston of the cylinder 52 to the original position thereof is detected by the sensor S8, the suction of the base plate by the suction members is stopped.

The base plate 1 is thus automatically supplied from the base plate feeder 60 to the first-stage portion of the conveyance passage A—A on the base plate conveyor 30 by the base plate mover 40.

The base plate 1 supplied to the conveyance passage A—A as described above is conveyed by the conveyance rollers 31A and 31B rightward with regard to FIG. 1, so that the leading edge of the base plate in the direction of the conveyance thereof in the passage passes by the sensor S2 shown in FIG. 3 and the base plate is transferred to a next-stage processing appliance. For example, the sensor S2 is a magnetic sensor capable of detecting the conveyance of a plurality of base plates 1 in a mutually overlaid state, which is an improper conveyance. If the improper conveyance is detected by the sensor S2, the motor 33 and the conveyance rollers 31 are stopped on the basis of the output detection signal from the sensor. The operating person can be notified of the improper conveyance, by the lighting of a warning lamp, the sounding of a warning buzzer or the like on the basis of the output detection signal.

When it is detected by the sensor S6 that the trailing edge of the base plate 1 in the direction of the conveyance thereof in the passage A—A has passed by the sensor, another base plate 1 is supplied from the base plate storage section 60 to the passage by the base plate mover 40. Such supplying is automatically repeated as long as there are base plates 1 housed in the storage section 60. After all the base plates 1 housed in the storage section 60 are supplied therefrom to the conveyance passage A—A, the light emitted from the light emitter O of the sensor S3 shown in FIG. 3 is transmitted through the through hole 63 of the storage section and not reflected to the light receiver I of the sensor as shown in FIG. 7, when the vertically swung arm member 41 of the base plate mover 40 is moved to such the base plate. At that time, no base plate is judged to be present in the storage section 60. As a result, the arm member 41 is put out of sucking action and returned to the conveyance passage A—A. In that case, the base plate conveyor 30 may notify the operating person of the completion of the supplying of all the base plates 1 from the storage section 60 to the conveyance passage A—A.

After the completion of the supplying, the carrying stand 70 supporting the storage section 60 containing no base plate is removed from the base plate conveyor 30. Another carrying stand 70 supporting another base plate storage section 60 containing electrically insulating base plates 1 is then mounted on the body of the base plate conveyor 30.

The base plate receiving action of the base plate conveyor 30 having the base plate storage section 60 mounted as an unloader at the end of the base plate conveyance passage A—A on the conveyor is described from now on.

The base plate storage section 60 is first mounted at the last-stage portion of the conveyance passage A-13 A on the conveyor 30. At that time, there is no electrically insulating base plate in the box 61 of the storage section 60 secured to the carrying stand 70 which is connected to the base plate conveyor 30. The connection is detected by the proximity sensor S5. The power switch of the conveyor 30 is then turned on. Because of the turning-on of the power switch and the output detection signal from the proximity sensor S5, the motor 33 is driven so that the conveyance rollers 31, 31A and 31B shown in FIG. 3 are rotated in the direction reverse to that in the above-described base plate feed action of the base plate conveyor 30.

The direction of the rotation of the conveyance rollers is chosen by a selection switch provided in the controller 34 but not shown in the drawings. Along with the start of the rotation of the conveyance rollers, the base plate stopper 38 shown in FIGS. 1 and 3 is protruded up into the conveyance passage A—A by the pneumatic cylinder 39. After that, it is detected that the vertically swung arm member 41 of the base plate mover 40 is present in the passage A—A on the conveyor 30 and none of the base plates 1 is on the arm member. The position of the arm member 41 is detected by the sensor S10 on the pneumatic cylinder 54 and the sensor S8 on the pneumatic cylinder 52. The presence of the base plate 1 is detected by the sensors S1, S3, S4 and S6. The base plate 1 subjected to prescribed processing by a processing appliance in a preceding step is conveyed in the conveyance passage A—A on the conveyor 30 toward the base plate storage section 60, leftward with regard to FIG. 1. The conveyance of the base plate 1 is stopped by the base plate stopper 38 shown in FIGS. 1 and 3. The stoppage is performed on the basis of the detection output signal from the sensor S1 having detected the leading edge of the base plate 1 in the direction of the conveyance thereof. When it is then detected by the sensors S4 and S6 that the arm member 41 is present in the conveyance passage A—A and the base plate 1 is not present on the arm member, the base plate stopper 38 is moved out of the conveyance passage.

The motor 33 and the pneumatic cylinders 37 are driven in conjunction with the movement of the stopper 38 out of the conveyance passage A—A so that the base plate 1 is conveyed onto the arm member 41, toward the base plate storage section 60, by the rotary forces of the conveyance rollers 31, 31A, 31B and 31D and the pinch roller 35 and the pinching force thereof.

When the leading edge of the base plate 1 being conveyed in the passage A—A has passed by the sensor S6 shown in FIG. 3, stoppers 30B, which are provided at the last-stage end of the conveyance passage A—A and are pins, for example, are protruded into the passage on the basis of the detection output signal from the sensor.

The stoppers 30B are disposed in order to prevent the base plate from falling off the passage when being conveyed therein.

When a prescribed time such as about one second has lapsed since the leading edge of the base plate 1 being conveyed in the passage A—A passed by the sensor S4 shown in FIG. 3, the rotation of the motor 33 and the conveyance rollers 31, 31A and 31B is ceased so that the conveyance of the base plate is stopped. The stoppage of the conveyance of the base plate 1 is performed when the surface of the plate is present over the sensor S3. The time from the passing of the leading edge of the base plate 1 by the sensor S4 to the stoppage of the conveyance of the base plate is preset by a timer provided in the controller 34 but not shown in the drawings. When the conveyance of the base plate 1 is stopped, the stoppers 30B are moved out of the conveyance passage A—A and the base plate stopper 38 is protruded into the passage to prevent the following base plate 1 from being conveyed onto the base plate mover 40 while the mover is in action. The stopped plate 1 is now positioned above sensor S3.

Immediately after the timer in the controller 34 stops the conveyance of the baseplate on the rollers 31,31A, the controller initiates upward movement of the rack 51 on pneumatic cylinder 52, thereby producing rotation of pinion 45 and swinging movement of the arm 41 toward the plate 1 in the direction shown by arrow F. When the arm 41 has swung a predetermined distance, the suction members reach the position shown in FIG. 8 and sensor S3 detects the presence of the plate so that the suction means is put into sucking action on the basis of the detection output signal from the sensor. Because of the sucking action, the base plate 1 is sucked by the base plate suction members 42 on the vertically swung arm member 41 of the base plate mover 40.

After suction action has been initiated by sensor S3, the rack 51 continues to be moved upward by the pneumatic cylinder 52 of the base plate mover 40 as shown by the arrow C in FIG. 4, so that the arm member 41 is swung up through the action of the pinion 45 and the rotary shaft 43 as shown by the arrow F in FIG. 4. At the end of the swing of the arm member 41, the position of the piston of the pneumatic cylinder 52 is detected by the sensor S7, and it is detected by the vacuum gauge in the suction line that the base plate 1 is securely sucked by the suction members 42 on the arm member. The pneumatic cylinder 54 is driven on the basis of the detection output signals from the sensor S7 and the vacuum gauge so that the cylinder pushes down the moving base 46 along the guide and support members 49 through the action of the base support frame 53. As a result, the arm member 41 and the base plate 1 sucked thereto are translated toward the box 61 of the base plate storage section 60 as shown by the arrow G in FIG. 1. The base plate 1 then comes into contact with the base plate storage surface of the box 61 of the storage section 60, and is translated in the direction of the arrow G. Because of the translation, the elastic members 42D of the base plate suction members 42, which are shown in FIG. 6, are compressed so that the distance between the base plate 1 and the arm member 41 is decreased. As a result, the sensor S3 stops reacting, so that the translation of the arm member 41 is ceased on the basis of a reaction stoppage signal. The cessation of the translation of the arm member 41 is performed by the brake means provided on the pneumatic cylinder 54. The suction means is put out of the sucking action in conjunction with the cessation of the translation of the arm member 41.

The translation of the arm member 41 is thereafter resumed so that the member is moved away from the base plate storage section 60 as shown by the arrow G. Since the suction means is already put out of the sucking action at that time, the base plate 1 is not sucked to the arm member but left in the box 61 of the storage section 60 in such a manner that the base plate is leant against the inside of the section. The translation of the arm member 41 is performed by the pneumatic cylinder 54.

When the piston of the pneumatic cylinder 54 is detected by the sensor S9, the drive of the pneumatic cylinder 52 is started on the basis of the detection output signal from the sensor so that the cylinder 52 moves down the rack 51 as shown by the arrow C in FIGS. 1 and 4, to swing the arm member 41 downward as shown by the arrow F in FIGS. 1 and 4. After that, the return of the piston of the cylinder 54 to the original position thereof is detected by the sensor S10, the arm member 41 is moved to the base plate conveyance passage A—A, and the return of the piston of the cylinder 52 to the original position thereof is detected by the sensor S8. Because the series of these operation steps are taken, the base plate 1 is automatically received from the last-stage portion of the base plate conveyance passage A—A into the base plate storage section 60 through the use of the base plate mover 40. Such series of operation steps are repeatedly taken so that the base plates 1 subjected to the prescribed processing are sequentially housed in the storage section 60. The number of the times of the repeated taking can be preset by the counter of the controller 34 so as to automatically put the base plate mover 40 out of action, the operating person may be notified of the completion of the reception of the base plates 1 when the base plate mover 40 is automatically put out of action. Automatically putting the mover 40 out of action is performed through the sensor S9 provided on the pneumatic cylinder 54 of the mover. The quantity of the movement of the piston of the cylinder 54 decreases due to the increase in the number of the base plates 1 housed in the box 61 of the base plate storage section 60, so that the output detection signal from the sensor S9 is generated or ungenerated due to the change in the quantity of the movement of the piston. For that reason, the base plate mover 40 can be automatically put out of action through the sensor S9.

The conveyance rollers 31, 31A and 31B of the base plate conveyor 30 may be always rotated during the supplying of the base plate 1 and during the reception thereof. For the rotation, the control of the stoppers 30B disposed at the end of the base plate conveyance passage A—A is slightly changed. For example, the time from detecting the leading edge of the base plate 1 by the sensor S4 to moving the stoppers 30B out of the conveyance passage A—A is controlled, for the rotation, so that the stoppers are moved out of the conveyance passage after the base plate conveyed onto the arm member 41 of the base plate mover 40 is sucked by the base plate suction members 42.

Since the base plate conveyor 30 and the base plate mover 40 are regulated by a programmable control unit such as a sequence controller, the order and duration of operation of the conveyor and the mover can be easily altered.

After the reception of the base plates 1 from the conveyance passage A—A into the base plate storage section 60 in which the base plates are housed is completed, the carrying stand 70 supporting the storage section is removed from the base plate conveyor 30 and another carrying stand 70 supporting another base plate storage section 60 containing no base plate is attached to the conveyor.

The former base plate storage section 60 containing the base plates 1 housed therein is mounted together with the former carrying stand 70 at the first-stage portion of the base plate conveyance passage A—A on another base plate conveyor 30 so that the storage section is used as a base plate feeder.

As described above, each of the base plate conveyors 30 functions so that the electrically insulating base plates 1 are sequentially supplied from the base plate storage section 60 at one end of the base plate conveyance passage A—A onto the surface of the passage or received from the surface of the passage into the storage section.

The plural base plates 1 are piled in the storage section 60 in such a manner that the base plates are leant against the inside of the section and the surface of each of the base plates has the prescribed angle to the surface of the conveyance passage A—A.

The base plate mover 40 for automatically moving the base plate 1 from the storage section 60 to the conveyance passage A—A or from the passage to the section is provided at the casing of the base plate conveyor 30.

The plural base plates 1 can be piled in the storage section 60, regardless of the thickness of each of the base plates. Besides, the load of the piled base plates 1 on each other is reduced. For that reason, it is less likely to damage the surfaces of the base plates, especially the surfaces of the electroconductive films and those of the resist films thereon.

The base plate mover 40 has the arm member 41, which is vertically swung between the base plate storage section 60 and the base plate conveyance passage A—A. The arm member 41 is provided with the suction means which includes the base plate suction members 42 and the vacuum pump connected thereto and acts to hold the base plate 1 by the vacuum suction of the surface thereof. Since the holding by the vacuum suction differs from that by mechanical action such as grabbing, the base plate is securely held by the vacuum suction during the supplying and reception of the plate so that the surface of the plate or/and that of each of the electroconductive film and the resist film thereon are not damaged. Since only the uppermost of the base plates 1 piled in the base plate storage section 60 is held by the vacuum suction, two or more of the base plates are prevented from being simultaneously supplied.

A means for automatically altering the quantity of the translation of the vertically swung arm member 41 of the base plate mover 40 in the direction of the arrow G depending on the number of the base plates 1 housed in the box 61 of the base plate storage section 60 is provided. The means mainly includes the base plate suction members 42 provided on the arm member 41, the sensor S3, and the controller 34 for regulating the movement of the arm member on the basis of the detection output signal from the sensor.

As a result, the surface of each of the base plates 1 housed in the box 61 of the storage section 60 and the suction holding surface of the arm member 41 are always made parallel with each other so that the substantially entire surface of the base plate can be securely held to the arm member by the sucking action of the base plate suction members 42. Since the sensor S3, which is a light-reflection-type sensor and serves to control the sucking action of the suction means, is provided on the arm member 41 so that the suction holding of each of the base plates 1 is securely performed uniformly with regard to all the base plates, it is less likely to improperly supply or receive each base plate. This results in improving the production yield of the printed circuit boards.

Since the base plate storage section 60 containing the plural base plates 1 piled therein is mounted on the carrying stand 70 which is independently movable and can be removably attached to each of the base plate conveyors 30, the storage section can be used, together with the stand, for each of the base plate conveyor. For that reason, the base plates 1 piled in the storage section 60 do not need to be transferred therefrom into another storage section 60 when the base plates are to be subjected to further processing. Therefore, the time of handling of the base plates 1 is shortened, and the surfaces of the base plates and those of the electroconductive films and the resist films thereon are prevented from being damaged due to such transfer.

The base plate storage section 60 is made of the box 61 open in at least the portion thereof, through which the base plate 1 is supplied. The base plate support portion of the box 61 has the through hole 63, through which the light emitted from the sensor S3 provided on the vertically swung arm member 41 is transmitted to put the suction means out of sucking action. For that reason, the base plate supplying action of the base plate conveyor 30 can be automatically stopped after the base plates 1 piled in the base plate storage section 60 are all supplied therefrom.

Since electrical and mechanical components such as a sensor and a driver are not provided in or on the base plate storage section 60, the constitution of the section is simple.

The present invention is not confined to the abovedescribed embodiment, but may be embodied or practiced in other various ways without departing from the spirit or essential character thereof. For example, other drivers such as a hydraulic cylinder may be provided instead of the pneumatic cylinders of the base plate conveyor. Besides, the present invention may be embodied as a conveyor for base plates such as a semiconductor wafer, a glass plate and an ornamental building plate.

What is claimed is:

1. A base plate conveyor for use with one end of base plate conveyance passages for conveying a base plate having a conveyance surface, comprising:

base plate storage means for piling a plurality of base plates in such a manner that the base plates lean against an inside thereof at a prescribed angle to said conveyance surface; and base plate moving means for automatically and successively moving each base plate between said base plate conveyance passage and said base plate storage means when said base plate moving means senses that a leading base plate is located in a desired position for moving, said base plate moving means comprising a swingable arm member that is vertically rotatable and translationally moveable, and sensing means for sensing when a distance between a moved base plate and said swingable arm member decreases and for automatically stopping motion of said swingable arm member in response thereto.

2. The base plate conveyor according to claim 1, wherein said swung arm member comprises suction means for sucking the base plate by vacuum action so as to hold the base plate.

3. The base plate conveyor according to claim 2, wherein said swung arm member further comprises second control means for controlling the sucking action of said suction means.

4. The base plate conveyor according to claim 3, wherein said base plate storage means comprises a base plate storage section defined by an open box having a cutaway portion thereof, said base plate storage section having a through hole, and a carrying stand for mounting said base plate storage section thereon, said carrying stand being independently movable and being removably attached to said base plate conveyance passage, and said second control means comprises a photosensor unit from which light is transmitted through said through hole to cease the sucking action of said suction member.

5. The base plate conveyor according to claim 1, wherein said base plate moving means further comprises first control means for changing an amount of the movement of said swung arm member automatically in accordance with the number of the base plates piled in said base plate storage means.

6. The base plate conveyor according to claim 1, wherein said base plate storage means comprises a base plate storage section and a carrying stand for carrying said base plate storage section thereon, said carrying stand being independently movable and being removably attached to said base plate conveyance passage.

7. The base plate conveyor according to claim 1, wherein said base plate moving means comprises suction means for holding the base plate while the swung arm member moves the base plate between the conveyance passage and storage means, and sensor means for sensing when a base plate is located a desired distance from the sensor means and controllably turning the suction means on and off.

8. The base plate conveyor according to claim 7, wherein the sensor means comprises a photosensor.

9. The base plate conveyor according to claim 1, wherein said translational movement is in a direction perpendicular to a length of the swung arm member.

10. The base plate conveyor according to claim 1, wherein said base plate moving means further includes a guide and support frame extending in a direction parallel to said translational movement of said swung arm member.

11. The base plate conveyor according to claim 10, further comprising:

a moveable base slidable along said guide and support frame for supporting translational movement of said swung arm member, and rotational support frames for supporting rotational movement of said swung arm member.

12. A base plate conveyor adapted for use with a plurality of processing appliance units disposed along with a plurality of base plate conveyance passages, said base plate conveyance passages having conveyance surfaces respectively, comprising:

base plate storage means for piling a plurality of base plates in such a manner that the base plates lean against an inside thereof at a prescribed angle to one of said conveyance surfaces, said base plate storage means having a base plate storage section and a carrying stand for carrying said base plate storage section thereon;

a plurality of base plate moving means each for automatically and successively moving each base plate between one of said base plate conveyance passages and said base plate storage means when said base plate moving means senses that a leading base plate is located in a desired position for moving, each of said base plate moving means comprising a swingable arm member that is vertically rotatable and translationally moveable, suction means for holding a moved base plate while the swingable arm member moves the base plate between the conveyance passage and storage means, and sensor means for sensing when said moved base plate is located a desired distance from the sensor means and controllably turning the suction means on and off in response thereto, said base plate moving means being disposed at first-stage and end-stage portions of each of said processing appliance units, said carrying stand being selectively mounted on any one of said base plate conveyances passages.

13. The base plate conveyor according to claim 12, wherein the sensor means comprises a photosensor.

14. The base plate conveyor according to claim 12, wherein said translational movement is in a direction perpendicular to a length of the swung arm member.

15. The base plate conveyor according to claim 12, wherein each of said plurality of base plate moving means further includes a guide and support frame extending in a direction parallel to said translational movement of said swung arm member.

16. The base plate conveyor according to claim 15, further comprising:

a moveable base slidable along said guide and support frame for supporting translational movement of said swung arm member, and rotational support frames for supporting rotational movement of said swung arm member.

17. A base plate conveyor for use with one end of base plate conveyance passages for conveying a base plate having conveyance surface, comprising:

base plate storage means for piling a plurality of base plates in a manner that the base plates are leant against an inside thereof at a prescribed angle to said conveyance surface; and base plate moving means for automatically moving the base plate between said base plate conveyance passage and said base plate storage means, after said base plate moving means senses the base plate is located in a desired position for moving, said base plate moving means comprising an arm member, and suction means for holding the base plate while the arm member moves the base plate between the conveyance passage and storage means, and sensor means for sensing when a base plate is located a desired distance from the sensor means and controllably turning the suction means on and off.

18. The base plate conveyor according to claim 17, wherein said arm member being translationally moved in a direction perpendicular to a length of the arm member.

19. The base plate conveyor according to claim 17, wherein said sensor means comprises photosensors.

20. The base plate conveyor according to claim 17, wherein said base plate storage means is removable attach to the base plate conveyance passage, wherein the attachment maintains a definite relation between the base plate storage means and the base plate conveyance passage regardless of the arm member position.

* * * * *